Oct. 15, 1963 A. H. WILLINGER 3,107,289
THERMOSTATICALLY-CONTROLLED AQUARIUM HEATER
Filed Jan. 22, 1960 2 Sheets-Sheet 1
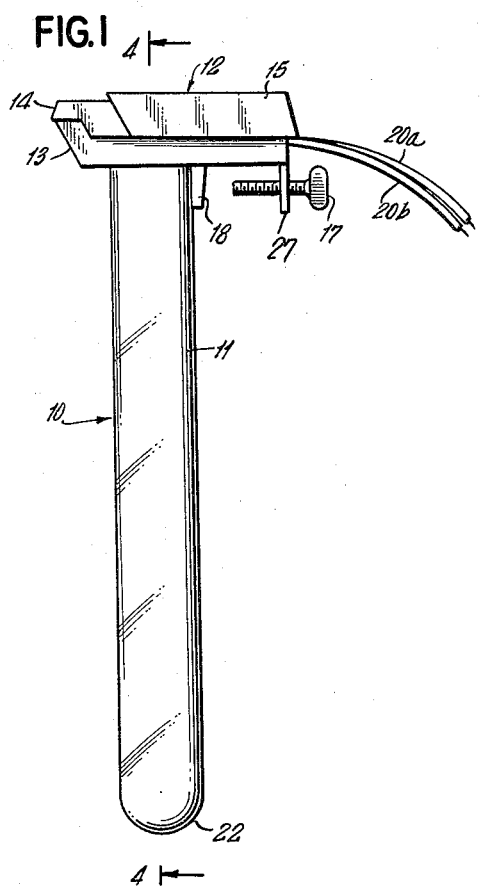
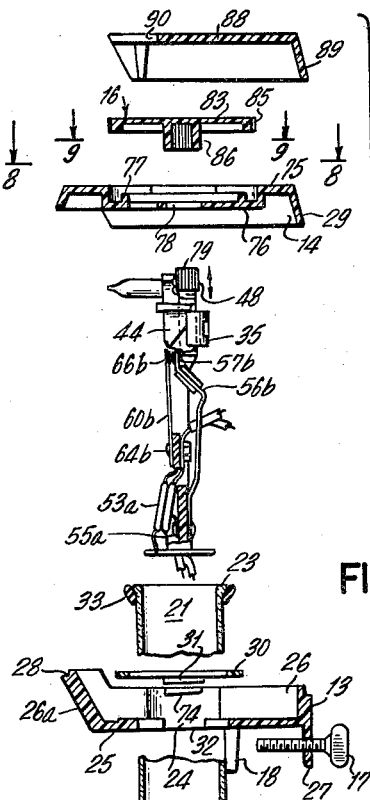
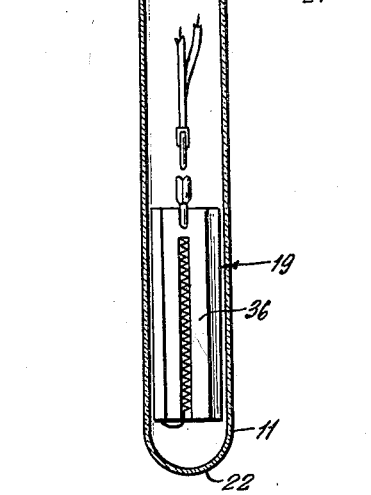
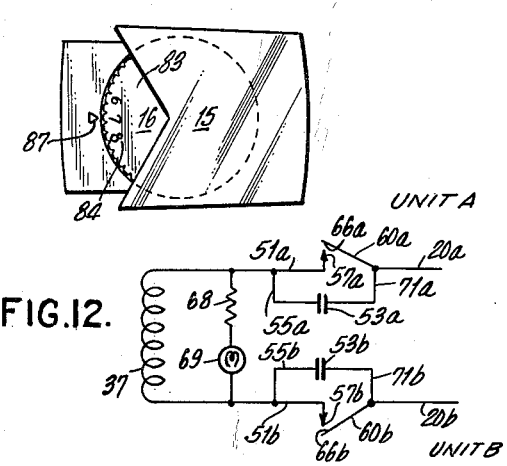
INVENTOR.
ALLAN H. WILLINGER
BY
ATTORNEY Oct. 15, 1963  A. H. WILLINGER  3,107,289
THERMOSTATICALLY-CONTROLLED AQUARIUM HEATER
Filed Jan. 22, 1960  2 Sheets-Sheet 2
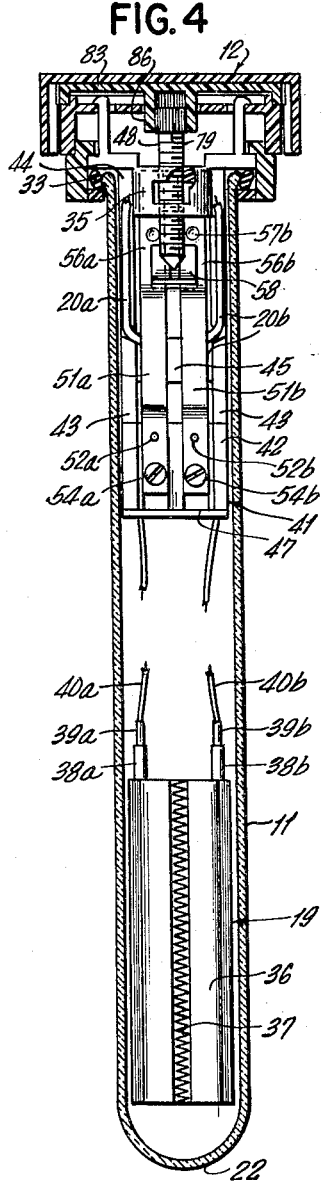
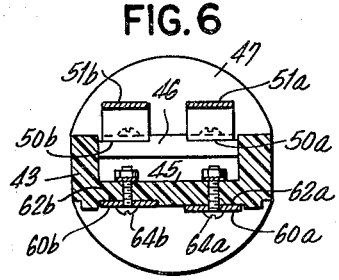
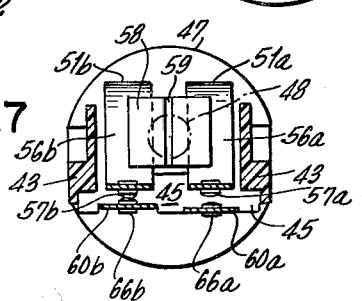
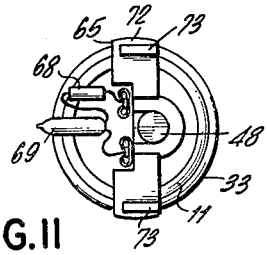
INVENTOR.
ALLAN H. WILLINGER
BY
ATTORNEY United States Patent Office 3,107,289
Patented Oct. 15, 1963

3,107,289
THERMOSTATICALLY-CONTROLLED
AQUARIUM HEATER
Allan H. Willinger, New Rochelle, N.Y., assignor to Aquariums Incorporated, Maywood, N.J., a corporation of Delaware
Filed Jan. 22, 1960, Ser. No. 4,150
12 Claims. (Cl. 219—41)

This invention relates to an aquarium heater and more particularly to a heater of this type having temperature control means.

It is accepted practice among aquarium hobbyists to utilize heating devices for raising the temperature of the aquaria to desired levels most suitable for the maintenance and propagation of the fish contained therein. To this end, such heating devices are provided with control means which are responsive to the changes in the temperature of the aquarium water in order to maintain the same at a constant level. The most convenient and economical form of temperature responsive control element has been found to be a bi-metallic strip interposed in the heater element circuit which is deflected in accordance with changes in temperature and makes and breaks associated electrical contact members. Certain difficulties have however been encountered in conjunction with the use of thermostatic controls of this type. Among these are excessive contact sparking which tends to pit or corrode the contact surfaces causing faulty contacts and interference with electrical appliances, such as radio and television receivers. To overcome these undesired effects, it has been the practice to provide a capacitor shunted across the thermostat contact members. If such a condenser should develop a fault, such as an open circuit, the above effects again become apparent. On the other hand, if the shunt condenser should develop a short circuit, the heating element will continue in uncontrolled operation, raising the aquarium temperature to undesired levels with disastrous consequences to the aquarium population. An additional malfunction which tends to develop is a "freezing" of the contact members. If this condition develops, there is again a loss of control and the uninterrupted operation of the heating element raises the water temperature to undesired levels. It is therefore essential that means be provided to compensate for or eliminate the undesired consequences of the malfunctions indicated above.

Thermostatically-controlled heaters of this type must provide for efficient functioning of the heating and control elements within physical limitations of the space and materials available. It is also important that means be provided for conveniently and economically calibrating the device so that it may be pre-set to any desired temperature and changes to different temperature settings may be readily accomplished with considerable accuracy. It is also desired that means be provided for indicating the operational state of the device, as well as to assist in reading the temperature setting scale. It is also desired that the device be readily accessible for the repair and replacement of parts while maintaining the device in suitable waterproof condition when assembled. It is also a desideratum that the device be capable of economical large scale production assembly from readily available materials.

It is therefore an object of this invention to provide a thermostatically-controlled aquarium heating device which may be readily and economically produced and assembled on a large scale.

It is also an object of this invention to provide a device of the character indicated which is efficient in operation and attractive in appearance and wherein many of the parts may be formed of a plastic material.

Another object of this invention is to provide a device of the character indicated wherein an arrangement is incorporated to effectively protect the contact surfaces and reduce sparking while providing against excessive heater operation in the event of certain malfunctions, such as the shorting of a capacitor or the freezing of a contact for example.

An additional object of this invention is to provide a device of the character indicated with means for readily calibrating the temperature settings so that the device may be pre-set for any desired temperature with a considerable degree of accuracy, means being also provided for preventing the accidental alteration of the temperature setting.

A further object of this invention is to provide a device of the character indicated wherein an indicator is provided to indicate the operational condition of the heating element while simultaneously illuminating the temperature scale.

Other and more specific objects of the present invention will be apparent from the following description as read in connection with the accompanying drawings.

In the drawings:

FIGURE 1 is a side elevational view of an embodiment of a thermostatically-controlled aquarium heater in accordance with the present invention;

FIGURE 2 is a top plan view thereof;

FIGURE 3 is an exploded view;

FIGURE 4 is a cross-section taken along line 4—4 of FIGURE 1;

FIGURE 5 is a fragmentary view of the heating element and thermostatic control chassis as viewed from the opposing side to the one shown in FIGURE 4, the temperature control screw being removed and showing the indicator assembly in separated condition;

FIGURE 6 is a cross-sectional view of FIGURE 5 taken along line 6—6 thereof;

FIGURE 7 is a cross-section of FIGURE 5 taken along line 7—7 thereof;

FIGURE 8 is a view taken along line 8—8 of FIGURE 3;

FIGURE 9 is a cross-sectional view taken along line 9—9 of FIGURE 3;

FIGURE 10 is a top plan view of the lower case with the seating ring in position partly broken away;

FIGURE 11 is a top plan view of the thermostatic control chassis as seen in FIGURE 3; and FIGURE 12 is a schematic diagram of the electrical circuit.

Referring to the figures in which similar identification numerals identify the same or similar products throughout, an embodiment of the invention is illustrated. As may be seen from FIGURE 1, the instant aquarium heater designated generally by the numeral 10, comprises an elongated heat-resistant tube 11 which is suspended from a housing 12 comprising lower and upper cases 13 and 14 respectively and is surmounted by a safety cover 15, a temperature control knob 16 is disposed intermediate the upper case 14 and safety cover 15. The aquarium heater 10 is mounted in a conventional manner upon the rim of an aquarium tank, not shown, by means of engagement of clamping screw 17 with the peripheral edge of the tank which is disposed between the end of the clamping screw and downwardly projecting bosses 18. The lower portion of the heat-resistant tube contains the heating element or cartridge 19 and is immersed below the water level of the tank when in use. Suitable electrically conductive leads 20a and 20b project from the housing 12 for connection to a source of electric power.

As may be additionally seen from FIGURES 3, 4 and 5, the main body of the aquarium heater 10 comprises an elongated tube 11 which is advantageously formed of a heat-resistant glass provided with an enclosed bottom 22 and an open mouth 21 surrounded by an outwardly projecting peripheral flange 23. The tube 11 is suspended through an opening 24 provided in the bottom wall of lower case 13. Lower case 13 comprises a shallow pan-like enclosure having a bottom wall 25 and perimetric upstanding side walls 26 surrounding said bottom wall. The lower case 13 is provided with a depending boss 27 having a screw-threaded aperture within which adjustable clamping screw 17 is threadedly received. A pair of depending bosses 18 are additionally provided extending from the bottom wall 25 of the lower case in confronting relation with the end of said clamping screw 17. The arrangement permits the rim of an aquarium tank to be received in the variable clamping space thus formed and to be clamped by the adjustment of clamping screw 17 so as to rigidly support the entire heater assembly upon the aquarium. The upper rim of the perimetric side wall 26 of lower case 13 is provided with a peripheral stepped portion 28 which is adapted to receive and seat the complementary depending side wall 29 of upper case 14, as will be more clearly pointed out hereafter in order to form an appropriate overlapping seal therewith. It will be noted that the forward portion of perimetric wall 26 of the lower case is elevated as indicated at 26a. As heretofore indicated, the bottom wall 25 of the case is provided with an opening within which the tube 11 is received and suspended.

As will be seen from the aforesaid figures and FIGURE 10, a seating ring 30 surrounds said opening, said seating ring being provided with depending positioning lugs 31, which are received in complementary notches 32 formed in the bottom wall 25. As heretofore indicated, tube 11 is suspended through the aforesaid aperture and is seated against the seating ring 30 by means of the interposition of a gasket 33, which may be of rubber or similar elastomeric material in engagement with the peripheral flange 23 of the tube mouth.

Tube 11 carries a heating element designated generally by the numeral 19, which is disposed in the lower portion thereof and advantageously comprises a grooved cylindrical body 36 of ceramic or similar material which in turn supports heating coils 37, the terminal ends of which are connected to jacks 38a and 38b respectively, rigidly secured to the ceramic body 36. Supply of electric power to the heating coils is achieved through leads 40a and 40b, which terminates in disengageable connecting push pins or plugs 39a and 39b.

In order to control the operation of heating element 19, a thermostatic control arrangement is provided in the form of a thermostatic control chassis designated generally by the numeral 41, which is more particularly illustrated in FIGURES 3, 4 and 5. Said thermostatic control chassis 41 comprises a chassis support 42, which is advantageously formed of a molded plastic electrically insulating material. The chassis support 42 comprises a pair of vertically disposed spaced-apart posts 43 which are interconnected by means of transverse members 44, 45 and 46. The lower end of the chassis support 42 terminates in a horizontally extending baffle plate 47 which extends across the tube 11, providing sufficient clearance for the passage of the lead wires 40a and 40b and forms a separating partition between the heating element 19 and the thermostatic control chassis 41.

The upper transverse connecting member 44 is provided with an enlarged portion 35 having an axially extending threaded aperture for receiving the temperature control screw 48, as will more clearly appear hereafter. The upper end of chassis support 42 is additionally provided with laterally extending locking flanges 65 and a pair of spaced-apart upwardly projecting locking fingers 49. The lower transverse member 46 is provided with a pair of axially extending indentations or grooves 50a and 50b which form seats and locating means for the adjustable contact members 51a and 51b. The adjustable contact members 51a and 51b are of similar configuration and advantageously comprise strips of flexible resilient metal, thus forming electrical conductors. The lower ends of said adjustable contact members are seated in grooves 50a and 50b respectively and are additionally located by means of apertures 52a and 52b, which receive complementary bosses projecting from the surface of the lower transverse member 46. The lower ends of said adjustable contact members 51a and 51b are fixedly secured in position by means of terminal screws 54a and 54b respectively which extend through perforations in the lower transverse member. Eyelets or similar fastening means may also be advantageously employed. Screws 54a and 54b further serve as electrical terminal connecting points, each interconnecting one of heater leads 40a and 40b with the lower end of an adjustable contact member. Terminal screws 54a and 54b also have connected thereto one of the leads of the spark suppressing condensers 53a and 53b respectively. Thus, lead 55a of condenser 53a is connected to screw 54a and lead 55b of condenser 53b is connected to screw 54b. The upper ends of the adjustable contact members are free of securement and are bent to provide inclined faces 56a and 56b and terminate in vertically disposed portions bearing contact points 57a and 57b respectively. The said inclined portions of the adjustable contact members are received in insulating bridge 58 which is also advantageously formed of a molded electrically insulating plastic material. Said bridge 58 is provided with side slots within which said inclined portions 56a and 56b are received, thereby retaining the upper portions of said adjustable contact members 51a and 51b in fixed laterally spaced relation and providing an axially grooved inclined camming surface 59 against which the conical tip of the temperature control screw 48 bears. It will be noted that since temperature control screw 48 is threadedly received in the aperture of enlargement 35 in the upper transverse connecting member 44, the axial adjustment of the position of said screw causes the tip thereof to ride in groove 59 and bear against the bridging member 58, thereby simultaneously moving the upper ends of the adjustable contact members 51a and 51b the same distance laterally to the left, as viewed in FIGURE 3, when the screw is lowered, and to the right when the screw is elevated. These contact members are formed of a resiliently flexible metallic strip material and this characteristic of the material causes the bridge to bear constantly in a resilient manner against the lower tip of the temperature control screw 48, so that, as said screw is axially moved, the adjustable contact members 51a and 51b and consequently the contact buttons carried thereby, follow and are simultaneously moved laterally an equivalent amount, as heretofore indicated.

The intermediate transverse connecting member 45 serves as a support for the thermostatic bi-metallic strips comprising contact members 60a and 60b. The intermediate transverse connecting member 45 is provided with a pair of longitudinally extending laterally spaced grooves 62a and 62b, which are of differing depth as may be more particularly seen in FIGURES 6 and 7. The lower or fixed ends of the bi-metallic members 60a and 60b are disposed within said grooves respectively and are secured in position as by means of screws 64a and 64b, which pass through registering apertures in the contact and transverse members. Eyelets or similar fastening means may also be employed for this purpose. The upper bi-metallic contact members comprise planar strips of electro-conductive material and are free of securement at their upper ends. They are each provided with a contact point as indicated at 66a and 66b. The contact points 66a and 66b are disposed in confronting relation with the contact points 57a and 57b respectively carried by the adjustable contact elements 51a and 51b. It will be apparent from the foregoing that as a consequence of this arrangement there are formed two thermostatic control units, each of said units comprising an adjustable contact member and a thermally actuated bi-metallic strip contact member in confronting relation therewith. For the purpose of convenience, the thermostatic control unit comprised of bi-metallic contact member 60a and ajustable contact member 51a will be referred to as thermostatic unit A and the thermostatic control unit comprised of bi-metallic contact member 60b and adjustable contact member 51b will be referred to as thermostatic unit B. It will also be apparent that the positions of the adjustable contact members are simultaneously adjusted or varied in an equal degree by the axial adjustment of the position of temperature control screw 48. Contact buttons 57a and 57b are therefore disposed in lateral alignment with each other, which alignment is maintained for all positions of adjustment of temperature control screw 48.

On the other hand, however, the contact buttons 66a and 66b are initially offset from each other when viewed laterally. This offset relationship is due to mounting of the lower ends of the thermostatic bi-metallic contact members 60a and 60b in grooves 62a and 62b which are of differing depth. The walls of said grooves and consequently the contact members mounted therein are disposed in offset parallel planes. Consequently, contact button 66b is initially in closer proximity to its confronting contact button 57b than is contact button 66a to its associated confronting contact button 57a. FIGURE 7 illustrates the relative position of the contact members and the contact buttons prior to the initial adjustment of the device for a particular temperature setting. As the temperature control screw is adjusted and the pointed end thereof lowered, the upper ends of the adjustable contact members are brought into closer proximity to the bi-metallic contact members. Thus, as the screw is progressively lowered, contact is first established between contact buttons 57b and 66b and continued adjustment of the screw causes the bi-metallic member 60b to be slightly deflected as contact is also made between contact buttons 57a and 66a. As the contact buttons abut with each other, electrical continuity is established and the circuit of that particular thermostatic unit is closed. The bi-metallic members are formed of material having similar thermal response characteristics. As the ambient temperature in the portion of the tube occupied by the control chassis is raised, the upper ends of the bi-metallic members will be deflected away from the adjustable contact members. Assuming a position of adjustment as heretofore outlined wherein the contacts on thermostatic units A and B are both closed, it will be apparent that such increase in temperature will initially cause the circuit of thermostatic unit A to be broken due to the thermal deflection of bi-metallic member 60a. At this point, thermostatic unit B will remain closed. With a continued rise in the ambient temperature, a point will be reached wherein the circuit of thermostatic unit B will also be broken due to the deflection of bi-metallic member 60b. On the other hand, as the temperature drops from this point, the circuit of unit B will first be restored followed by a restoration of the circuit in unit A with a continued drop in temperature. The thermostatic units thus operate at a temperature differential as established by the initial difference in the mounting position of the bi-metallic contact members. Thermostatic unit B is thus actuated only when this temperature differential is exceeded. If the temperature differential is not exceeded, the control function is carried on by thermostatic unit A. It has been found advantageous for aquarium purposes to initially mount the bi-metallic members for a temperature differential of approximately 3–5° F. Thus, assuming a temperature differential of 5° F. and setting such that unit A will open when 72° F. has been attained, unit B will remain closed until the ambient temperature in the control zone reaches 77° F. In normal operation, the circuit to the heating element would be broken by the operation of unit A at 72° so that no further temperature rise will be achieved. Unit A will again operate to close the heating element when the temperature in the control zone reaches 77° F. In normal of a malfunction of unit A or its associated circuitry, such as the freezing of its contacts or the shorting of the spark suppressing condenser, the temperature in the control zone may rise above the 77° level at which point unit B is rendered operative to prevent further temperature rise. Thus, the initial control function is carried on by unit A while unit B operates as a reserve safety unit to prevent runaway temperatures. The circuit arrangement will be more particularly hereinafter described.

The screws 64a and 64b also serve as electrical terminal connecting points for interconnecting the lower ends of bi-metallic members 60a and 60b with leads 71a and 71b from condensers 53a and 53b respectively. The ends of electrical leads 20a and 20b are also connected to said terminal screws 64a and 64b respectively.

The thermostat control chassis 41 is provided with a detachable indicator or pilot light assembly, designated generally by the numeral 63, as may be more particularly seen in FIGURES 5 and 11. Said pilot light assembly comprises a pair of slide plugs 67 to which a resistor 68 and neon pilot light 69 are wired in series. The slide plugs are disengagedly received on extensions 70 formed on the adjustable contact members 51a and 51b. Thus, the pilot light assembly 66 may be pre-wired and the assembly slid into position upon said extensions as a unit. This arrangement not only facilitates the assembly of the device, but also makes it a relatively simple matter to replace the assembly as a unit if the resistor or pilot light should burn out or otherwise be rendered inoperative.

The upper end of the thermostat control chassis 41 is additionally provided with oppositely disposed laterally projecting locking flanges 65, which are provided with oppositely inclined upper cam surfaces 72 respectively and upwardly projecting locking fingers 49, each of which terminates in a latching tooth 73. In assembling the aquarium heater to this point, the heating cartridge 19 is connected to the thermostat control chassis 41 by inserting the prongs 39a and 39b into jacks 38a and 38b respectively and the entire assembly thus formed is then lowered into the heat-resistant tube 11 which is disposed within the aperture 24 of lower case 13. It will be noted that lower case 13 is provided with inwardly projecting cam lugs 74. These lugs are provided with inclined lower cam surfaces for mating contact with the cam surfaces 72 of the laterally projecting locking flanges 65. As a consequence of this arrangement, when the heating cartridge and thermostat control chassis are initially lowered into the tube, the chassis is rotated by grasping the locking fingers so that the locking flanges 65 are out of alignment with the inwardly projecting cam lugs 74 extending into the interior of the lower case. When the locking flanges 65 have been seated on the peripheral lip 23 of the tube 11, the chassis is rotated so that the upper cam surfaces 72 of the locking flanges abut with the lower faces of the cam lugs 74 and the continued rotation of the chassis causes the entire chassis to be wedged and depressed. The pressure of the locking flanges upon the peripheral lip of the tube 11 causes the gasket 33 to be compressed so as to firmly seat the tube on the gasket forming a seal therewith and simultaneously firmly seating and locking the chassis with the lower case. With the cartridge and chassis thus in position seated upon the tube and in locking engagement with the lower case, the upper case may now be locked in position.

The upper case 14, as may be seen from FIGURES 3, 4 and 8, comprises a shallow pan-like enclosure having a peripheral depending side wall 29 which is complementary in configuration to the upwardly directed side wall 26 of the lower case 13 and is adapted to seat on the peripheral stepped portion 28. It will be noted that the upper case is provided with a top wall 75 which is provided with a circular depressed central portion 76, including an upwardly directed circular rib 77. The depressed central portion 76 extends to the side edges of the upper case, as indicated at 80. The central depressed portion is also provided with a central perforation 78 through which the splined head 79 of the temperature control screw 48 projects freely when the upper case is in position. Said central depressed portion of the top wall 75 is also provided with a pair of generally rectangular slots 81 which are disposed in registration with the locking fingers 49. The distal side edges of the rectangular slots 81 are disposed somewhat inwardly with respect to the heads of the latch teeth 73, so that, when the upper case is brought into seating engagement with the lower case, the latch tooth portions 73 of the locking fingers 49 are each cammed inwardly by said side edges toward the central aperture and are resiliently deflected snapping back into position as the upper surface of the top wall clears the latch tooth, whereby the upper case is automatically locked into position, both with respect to the chassis and the lower case.

The manual adjustment of the temperature control screw is accomplished externally of the upper case by means of temperature control knob 16. Said knob is advantageously formed of a translucent molded thermoplastic material and comprises a face disc 83 carrying appropriate temperature indicating graduations 84 on the upper face thereof adjacent its circumferential edge which is serrated to permit the disc to be readily grasped and rotated. The circumferential edge of the disc is in the form of a depending circumferential flange 85 which is adapted to mate with the upwardly directed circumferential rib 77 on the upper case to form a locating and guide surface for the rotation of the knob. The flange rests in the space between said rib and the wall formed by the circular depression 76. The temperature control knob 16 is further provided with a centrally disposed depending hub 86 which is internally splined to mate with the splined head of temperature control screw 48. By reason of the complemental splined surfaces of the hub and screw head it is possible to mount the temperature control knob by merely lowering it into position thereon and to lock the same against relative rotation. Furthermore, the position of the graduations on the disc face may be altered with reference to indicating point 87 by merely raising the knob and registering the desired graduation thereon with the indicating point and then again lowering the knob into engagement with the splined temperature control screw head. The device may therefore be readily calibrated externally thereof so that the temperature setting may be read directly from the graduated disc. The extension of the circular depression 76 to the side edges of the upper case, as indicated at 80, exposes diametrically opposed portions of the control knob periphery to permit the knob to be rotated to any temperature setting desired. The aperture 82 in the top wall of the upper case allows the illumination from the pilot lamp 69 to be viewed through the translucent face disc 83 of the temperature control disc 16, so that the graduations thereon may be more readily read in addition to permitting the pilot indication to be viewed.

The housing is surmounted by a safety cover 15 which comprises a top wall 88 which is surrounded on three sides by a depending side wall 89. The side wall is interrupted along the front edge of the safety cover and the top wall thereof is provided with an indentation, as indicated by 90, so as to expose a portion of the face of the temperature control knob when the cover is in position. Internally extending abutments 91 retain the side walls in spaced relation to the circumferential edge of the temperature control knob so that the setting thereof is not disturbed when the cover is removed or replaced. It will be apparent that by reason of the combination of the cover member with the upper and lower cases and the character of the mating edges thereof, the entire device is enclosed in such manner that any water which may be accidentally splashed thereon or come in contact therewith is shed from the sides thereof and will not penetrate into the interior of the device so as to cause a malfunction thereof.

The initial calibration or setting of the device is readily accomplished by the user as the device is applied in a particular environment if the temperature readings on the control knob are to correspond with the aquarium water temperatures. In order to accomplish this calibration, the unit is mounted on the aquarium tank with which it is intended to operate and the control knob is rotated until the pilot lamp is illuminated to indicate that the heating element is in operation. The unit is permitted to remain in operation for several hours so as to stabilize the temperature of the aquarium and a reading of the temperature of the aquarium is then taken by means of a thermometer. The safety cover is removed and the temperature control knob 16 is lifted so that the splined hub 86 thereof clears the splined head of temperature control screw 48. The temperature control knob 16 is then free of engagement with the temperature control screw and may be rotated independently thereof. The temperature control knob 16 is rotated so that the numerical graduation 84 corresponding to the thermometer temperature reading is in juxtaposition with indicating point 87 carried by the upper case 14, whereupon the temperature control knob 16 is lowered into re-engagement with the splined head of temperature control screw 48. Thus, for example, if the temperature reading on the thermometer is 72° F., the numeral 72 is brought into juxtaposition with indicating point 87. As a result of this arrangement, the device is calibrated and may now be set for any desired temperature by merely rotating the temperature control knob to locate the desired temperature graduation 84 in juxtaposition with the indicating point 87. The rotation of the temperature control knob to the desired temperature correspondingly rotates temperature control screw 48, which in turn adjusts the position of the adjustable contact members so that the contacts of thermostatic switch unit A will open when the desired temperature has been reached so as to prevent the aquarium water from being over-heated and to maintain the temperature thereof at the desired level. By the same adjustment, thermostatic switch unit B is set to operate at the higher temperature differential as heretofore indicated. Thus, with an established temperature differential of 3° F., if unit A is set to operate and open its contacts at 72° F., unit B is simultaneously set and will open its contacts at 75° F., in the event that unit A loses control of the temperature by reason of some malfunction.

The electrical circuit of the aquarium heater is illustrated schematically in FIGURE 12, wherein the numbering has been made to correspond to the numbering of the physical components. It will be seen from said schematic diagram that thermostatic units A and B are wired so that they are in series with heating element 37 which is interconnected therebetween. The heating element is shunted by resistor 68 and indicating bulb 69 which are in series with each other.

The aquarium heater is illustrated in the condition wherein the aquarium has reached the desired temperature and consequently, the deflection of the bi-metallic strip 60a has broken the contacts 66a and 57a. Thus, assuming that the aquarium heater is initially set for 72° F., and the aquarium has reached such temperature, the thermostatic unit A will have opened while the thermostatic unit B remains closed. When the temperature of the aquarium drops, the thermostatic unit A again closes, restoring the circuit to the heating element 37 to elevate the aquarium temperature to the desired level. When such level is again reached, the thermostatic unit A opens. It will be noted that as a consequence of this arrangement, the thermostatic unit B is held in reserve and remains closed so long as thermostatic unit A functions properly.

It will be noted from the above circuit diagram, that the power is connected to the aquarium heater through the leads 20a and 20b, and that in view of the series interconnection of the thermostatic switch control units with the heating element 37, the contacts of both thermostatic control units must be closed in order to supply heating current to the heater 37. When the contacts of both thermostatic units are closed, power will also be supplied to illuminate the indicating lamp 69. It will also be noted that the thermostatic units are provided with capacitors 53a and 53b respectively, each capacitor being shunted across the contact points of its associated unit. Thus, capacitor 53a is shunted across contact points 57a and 66a through leads 55a and 71a. Similarly capacitor 55b is shunted across contact points 66b and 57b by means of leads 55b and 71b. As has heretofore been indicated, a malfunction in a thermostatic control switch unit of this type may occur in the form of contact points becoming frozen or welded to each other so as to prevent the opening of the contacts by the action of the bi-metallic strip, or a short may occur in the shunting capacitor. In such event, the thermostatic unit A will continue to permit current to pass therethrough in spite of excessive temperature elevation and the aquarium water may reach levels destructive to fish life. If this should occur in the instant arrangement, unit B will open if the temperature of the aquarium water reaches the differential for which the thermostatic units are initially set. Thus, if the aquarium heater is initially set for 72° F. and unit A loses its control function, as by freezing of the contacts or the shorting of the condenser, the temperature control function will be taken over by the thermostatic switch unit B at the 75° F. level, and the unit will continue to operate and maintain the aquarium at this temperature level. Although the temperature of the aquarium is thus raised slightly, the elevation thereof is not sufficient to be dangerous to fish life and can be tolerated without adverse effects. It will be noted that the opening and closing of contacts of unit B will not cause any sparking in view of the provision of the shunting capacitor 53b. It will be noted that unit B remains inoperative during the entire period of the proper operation of unit A. Consequently, the contacts thereof remain in their intitial condition until brought into action. The arrangement thus provides for an extended period of operation for the aquarium heater without attention or replacement.

From the foregoing, it will be apparent that there has been provided a thermostatically controlled aquarium heater which may be assembled from a plurality of sub-assemblies in a very efficient and economical manner. It will be apparent that the heating element or cartridge 19 is assembled as a unit, as is the thermostatic control chassis 41. These sub-assemblies are then assembled in the manner heretofore described in conjunction with the pilot lamp assembly, upper and lower case, safety cover and control knob, etc.

It will be noted that no tools are required for the assembly of the aquarium heater as a whole and that means are provided for disengagedly interconnecting the parts so that the entire unit may be assembled or disassembled as desired and the sub-assemblies or parts thereof replaced. This can be accomplished either at the factory or by the consumer without any difficulty and without the use of any extraneous fastening means. It will be noted that the arrangement permits the utilization of molded parts to great advantage and that the arrangement is such that aquarium water is prevented from entering the unit and any water spilled thereon is readily shed therefrom without entering the heater. Although the aquarium heater has been described with reference to the assembly procedure, it is merely necessary to reverse this procedure in order to disassemble it for the purpose of replacement or repair. Thus, the simplicity of this procedure will be apparent. It is merely necessary to remove the safety cover, lift off the control knob and manually compress the projecting latch teeth 73 toward each other to thereby release them from engagement with the upper case 14, which may then be lifted away. The thermostat control chassis 41 and heating cartridge 19 may then be removed from the tube 11 by grasping the locking fingers 49 and rotating them so that locking flanges 65 are moved out of engagement with cam lugs 74. The thermostat control chassis and heating cartridge may then be lifted out of the tube as a unit. The pilot lamp assembly and heating cartridge may then be disengaged from the thermostat control chassis and these sub-assemblies may then be replaced as a whole, or, if desired, components thereof may be repaired and the unit re-assembled. Thus, not only are there economies achieved in the manufacture of the unit, but the servicing thereof by inexperienced personnel or consumers is simplified and can be achieved at minimum cost.

While I have here shown and described a preferred embodiment of my invention, it will be apparent however that this invention is not limited to this embodiment and that many changes, additions and modifications can be made in connection therewith without departing from the spirit and scope of the invention as herein disclosed and hereinafter claimed. Having described my invention what I claim as new and desire to secure by Letters Patent is:

1. An aquarium heater comprising a housing having at least two parts and a tubular enclosure suspended therefrom, said tubular enclosure having an open mouth provided with a peripheral flange in communication with said housing, a heating element and a thermostatic control chassis disposed within said tubular element, means carried by said chassis for disengageably securing it to a portion of said housing, said means including transversely extending locking flanges for engagement with one part of said housing and vertically projecting locking fingers for engagement with the other part of said housing to thereby retain said housing parts in assembled relation.

2. The device according to claim 1 wherein said thermostat control chassis includes a support body extending into said tubular enclosure comprising spaced-apart posts interconnected by transverse members, a transverse baffle plate extending from the bottom of said support body forming a separating partition across said tubular enclosure.

3. An aquarium heater comprising a housing and a tube depending therefrom, an electrical heating element and a thermostatic control chassis disposed within said tube, said tube being provided with a peripheral flange and said housing including a lower and upper case of complementary configuration to form a generally rectangular box-like enclosure, said tube being suspended through an aperture in a wall of said lower case and having the peripheral flange seated therein, means carried by said chassis for disengageably retaining said housing and tube in assembled relation, said chassis including a lower portion extending into the interior of said tube and an upper portion extending into the interior of said housing, said means comprising transversely extending flanges formed on the upper portion of said chassis and vertically extending locking fingers, said transversely extending flanges overlying said tube flange and being disengageably secured to complementary locking means carried by said lower case to thereby lock said chassis, tube and lower case against relative movement, said vertically extending locking fingers being disengageably secured to complementary locking means carried by said upper case to thereby retain said housing, tube and chassis in assembled relation.

4. An aquarium heater comprising a housing and a tube suspended therefrom, said tube having a closed bottom and an open mouth surrounded by an outwardly extending peripheral flange, said housing comprising a lower case and an upper case in mating engagement therewith, said upper case comprising a top wall and a depending perimetric side wall to form a shallow downwardly directed pan-like body, said lower case being provided with a bottom wall and a perimetric upstanding side wall surrounding said bottom wall to thereby form a shallow pan-like body, said bottom wall having an aperture therein through which said tubular member is suspended, the peripheral flange of said tubular enclosure being seated therein, an electrical heating element disposed in the bottom portion of said tube and a thermostatic control chassis disposed in the upper portion of said tube, the upper end of said chassis extending through the interior of said enclosure, transversely extending flanges provided on other upper portion of said chassis overlying said tube flange and in disengageable clamping engagement with said flange and a portion of the perimetric side wall of said lower case, vertically extending locking fingers formed in the upper end of said chassis extending through the interior of said enclosure and registering apertures provided in the top wall of said upper case, said locking fingers terminating in latch teeth and being resiliently deflectable for disengageable latching engagement with the side walls of said apertures.

5. An aquarium heater comprising a housing and a tube depending therefrom, an electrical heating element disposed in the lower portion of said tube and a thermostatic control chassis disposed within the upper portion of said tube, said tube being provided with a peripheral flange and said housing including a lower and upper case of complementary configuration to form a generally rectangular box-like enclosure, said tube being suspended through an aperture in said lower case and having the peripheral flange seated therein, means carried by said chassis for disengageably retaining said housing and tube in assembled relation, said chassis including lower portion extending into the interior of said tube and an upper portion extending into the interior of said housing, a temperature control screw carried by said chassis provided with a splined head extending externally of said housing through an aperture provided in a wall thereof, a temperature control knob comprising a face disc having an internally splined hub for disengageably receiving said splined head whereby the angular orientation of said knob with respect to said adjustment screw may be varied externally of said housing.

6. The device according to claim 5, wherein a cover member is provided for surmounting said housing and knob.

7. The device according to claim 5, wherein a portion of said cover is recessed to expose a portion of said knob to view.

8. The device according to claim 5, wherein an illuminating means is provided within said housing for illuminating said knob through an aperture provided in the housing wall.

9. In an aquarium heater including an electrical heating element, a temperature control chassis responsive to the aquarium temperature for the control of the operation of said heating element, said chassis comprising a support, a pair of bi-metallic thermostatic switches mounted on said support in circuit with said heating element, each of said switches comprising a bi-metallic contact member and an adjustable contact member in juxtaposition therewith, and single adjustment means for simultaneously adjusting the position of both of said adjustable contact members with reference to said bi-metallic contact members.

10. A device according to claim 9, wherein said single adjustment means comprises a bridging member interconnecting said adjustable contact members for simultaneous adjustment movement and a single adjustment control element in operative relation with said bridging member for adjusting the position thereof whereby the operation of said single adjustment element effects the adjustment of the position of said adjustable contact members simultaneously.

11. A device according to claim 9, wherein said single adjustment means comprises a bridging member of electrical insulating material interconnecting said adjustable contact members for simultaneous adjustment movement and an adjustment screw having one end thereof in contact with said bridging means, whereby the axial movement of said screw upon the rotation thereof will cause said bridging member and the adjustable contact members secured thereto to be moved to a desired position of adjustment with reference to said bi-metallic members.

12. An aquarium heater comprising a pair of cooperating parts which define a housing, said parts being free of mutual securement, an enclosure depending from said housing, a heating element and a thermostatic control chassis disposed within said enclosure, and means for disengageably securing said chassis to both of said parts whereby to disengageably secure said parts together.

References Cited in the file of this patent

UNITED STATES PATENTS

| | | |
|---|---|---|
| 1,992,635 | Ritterhoff et al. | Feb. 26, 1935 |
| 2,353,151 | Elsenheimer | July 11, 1944 |
| 2,441,005 | Bradford | May 4, 1948 |
| 2,666,838 | Krah et al. | Jan. 24, 1954 |
| 2,699,488 | Arak et al. | Jan. 11, 1955 |
| 2,806,106 | Mertler | Sept. 10, 1957 |
| 2,806,123 | Steinbock | Sept. 10, 1957 |
| 2,811,629 | Danner | Oct. 29, 1957 |
| 2,931,884 | Jepson et al. | Apr. 15, 1960 |
| 2,951,358 | Miller | Sept. 6, 1960 |